March 12, 1968  R. P. ALEXANDER ETAL  3,373,193
DIMERIC HALOPHOSPHA (III)-CARBORANES AND THEIR PRODUCTION
Filed Nov. 13, 1963  2 Sheets-Sheet 1

○ BORON
◉ CARBON
⊞ PHOSPHORUS
◯ CHLORINE (HYDROGEN ATOMS ON BORON
OMITTED FOR CLARITY)

INVENTORS.
ROY P. ALEXANDER
HANSJUERGEN A. SCHROEDER
BY Walter D. Hunter
AGENT

March 12, 1968     R. P. ALEXANDER ET AL     3,373,193
DIMERIC HALOPHOSPHA (III)-CARBORANES AND THEIR PRODUCTION
Filed Nov. 13, 1963

FIGURE - 2

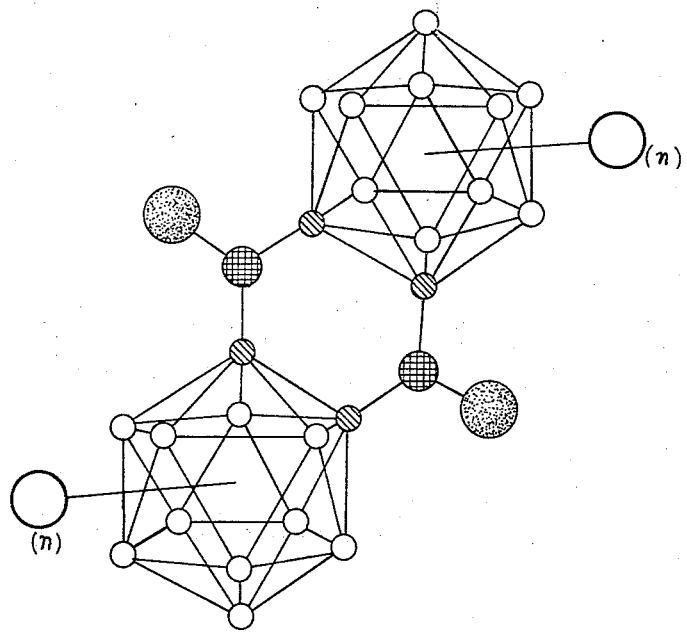

○    BORON

◉    CARBON

⊞    PHOSPHORUS

●    CHLORINE

○    HALOGEN ON BORON
(EACH HALOGEN ATOM IS ATTACHED TO A BORON ATOM, REPLACING A HYDROGEN ATOM. THE NUMBER OF HALOGEN SUBSTITUENTS IS DENOTED BY $n$.)

(HYDROGEN ATOMS ON BORON OMITTED FOR CLARITY)

INVENTORS.
ROY P. ALEXANDER
HANSJUERGEN A. SCHROEDER
BY
*Walter D. Hunter*

AGENT

United States Patent Office 3,373,193
Patented Mar. 12, 1968

3,373,193
DIMERIC HALOPHOSPHA (III)-CARBORANES AND THEIR PRODUCTION
Roy P. Alexander, Killingworth, and Hansjuergen A. Schroeder, New Haven, Conn., assignors to Olin Mathieson Chemical Corporation, a corporation of Virginia
Filed Nov. 13, 1963, Ser. No. 323,278
15 Claims. (Cl. 260—543)

ABSTRACT OF THE DISCLOSURE

Dimeric halophospha (III)-carboranes are prepared by reacting a carborane compound of the formula:

$$B_{10}H_nX'_{10-n}[C(M)C(M)]$$

Figure 1:
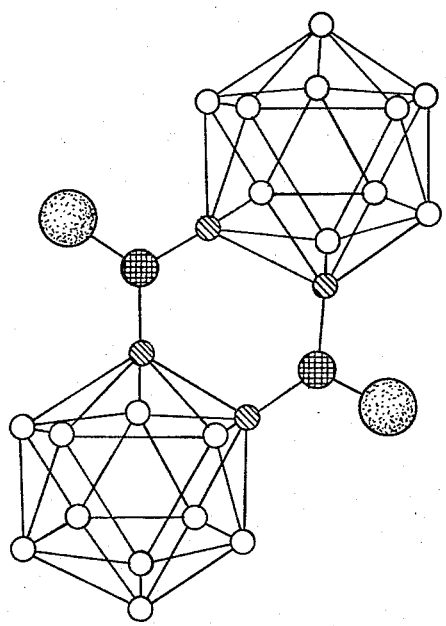

where X' is chlorine, bromine or iodine, n is an integer of from 0 to 10 and M is an alkali metal such as sodium, potassium or lithium, with a phosphorus halide of the formula:

$$PX_3$$

where X is chlorine, bromine or iodine.

---

This invention relates to dimeric halophospha (III) carboranes and to a method for their preparation. More particularly, this invention relates to the preparation of dimeric halophospha (III) carboranes of the formula:

$$X-P\begin{matrix}(B_{10}H_nX'_{10-n}[CC])\\ \\(B_{10}H_nX'_{10-n}[CC])\end{matrix}P-X$$

where X and X' are each selected from the group consisting of chlorine, bromine and iodine and n is an integer of from 0 to 10 inclusive.

The novel halophospha (III) carboranes of this invention are prepared by reacting an alkali metal carborane of the formula:

$$B_{10}H_nX'_{10-n}[C(M)C(M)]$$

where X' is selected from the group consisting of chlorine, bromine and iodine, n is an integer of from 0 to 10 inclusive and M is an alkali metal selected from the group consisting of sodium, potassium and lithium, with a phosphorus halide of the formula:

$$PX_3$$

where X is a halogen selected from the group consisting of chlorine, bromine and iodine.

Phosphorus halides useful in the process of this invention include, phosphorus trichloride, phosphorus tribromide, phosphorus triiodide, and mixtures thereof. The alkali metal-carborane compounds employed as starting materials in this process can be prepared by the process set forth in John W. Ager, Jr. application Ser. No. 809,571, filed Apr. 28, 1959. For example, dilithiocarborane $$(B_{10}H_{10}[C(Li)C(Li)])$$

can be made by reacting carborane $(B_{10}H_{10}[C(H)C(H)])$ with n-butyl lithium in the presence of diethyl ether. Useful alkali metal carborane compounds include dilithiocarborane, dilithiochlorocarborane, dilithiodichlorocarborane, dilithiotetrachlorocarborane, dilithioctachlorocarborane etc. and the corresponding potassium and iodine derivatives as well as the corresponding bromine and iodine derivatives.

Halocarboranes suitable as starting materials can be prepared in the manner described in Heying and Schroeder application Ser. No. 283,488 for Compounds and Method, filed May 27, 1963. For example, the compound dichloroborane $(B_{10}H_8Cl_2[C(H)C(H)])$ can be synthesized by passing gaseous chlorine rapidly into a solution of carborane in carbon tetrachloride irradiated with an ultraviolet light and at a temperature of not over 60° C.

Compounds of the carborane type can be prepared by the reaction of decaborane or an alkylated decaborane having one to two alkyl groups containing 1 to 5 carbon atoms in each alkyl group with an acetylenic hydrocarbon containing from two to ten carbon atoms in the presence of a wide variety of ether, nitriles or amines. The preparation of these compounds is described in application Ser. No. 741,976, filed June 13, 1958, of Ager, Heying and Mangold. For example, $B_{10}H_{10}[C(H)C(H)]$ can be prepared by reacting for about 12 hours at 125° C. a mixture of decaborane and tetrahydrofuran in an autoclave pressured to 100 p.s.i. with acetylene.

Preferably the reaction is carried out in the presence of an inert organic solvent. A wide variety of inert organic solvents can be used in carrying out the reaction. Any solvent which is inert to the reactants and the product can be employed, for example, the lower dialkyl ethers, such as methyl ethyl ether, diethyl ether, n-propyl butyl ether, di-n-butyl ether, di-isoamyl ether, etc. Other valuable solvents include pentane, hexane, heptane, benzene, xylene etc.

The reaction proceeds according to the following equation:

$$2B_{10}H_nX'_{10-n}[C(M)C(M)] + 2PX_3 \longrightarrow$$

$$X-P\begin{matrix}(B_{10}H_nX'_{10-n}[CC])\\ \\(B_{10}H_nX'_{10-n}[CC])\end{matrix}P-X + 4MX$$

wherein M, and X, X' and n have the same meaning as previously described.

Although the reaction can be carried out at temperatures as low as −20° C. up to about +95° C. the preferred reaction temperature is from about −10° C. to +40° C. Stoichiometric quantities of the reactants can be utilized, however, an excess of the phosphorus halide of from about 1.1 to 4 or more moles per mole of the carborane compound charged to the reactor can be employed. The reaction time will vary over a wide range and generally will be from about 0.5 to about 40 hours or more depending upon the reaction conditions. With certain solvents, such as hexane, the reaction product precipitates from the reaction mixture as it is formed and can be recovered by a number of methods well known in the art, such as centrifugation, decantation, filtration, etc. With other solvent, such as the lower dialkyl ethers, the product is soluble in the reaction mixture. Recovery of the product in such cases is accomplished, for example, by first evaporating the entire reaction mixture to dryness and then extracting the product from the residue with hot petroleum ether. The crude product can be recrystallized from a wide variety of solvents such as petroleum ether, pentane, hexane, heptane, etc. to give the pure product. The reaction can be conducted under pressures ranging from subatmospheric up to about +5 atmospheres or more, however, it has been found convenient to operate the process of this invention at atmospheric pressure.

The following examples illustrate specific embodiments of this invention, and are to be considered not limitative.

In the examples the term "moles" signifies "gram moles."

Example 1

To a solution of butyl lithium (0.304 mole) in ethyl ether (300 ml.) there was added, with ice-cooling, a solution of $B_{10}H_{10}[C(H)C(H)]$ (20 g., 0.139 mole) in ethyl ether (100 ml.) over a period of 10 minutes. The resulting white slurry was stirred under nitrogen and with ice-cooling for an additional 30 minutes. Ether and excess butyl lithium were then filtered from the precipitate through a coarse, sintered-glass filter stick. The remaining $B_{10}H_{10}[C(Li)C(Li)]$ (dilithiocarborane) was washed with ethyl ether (500 ml.) in two portions, and then slurried with 500 ml. of ether.

This dilithiocarborane (0.139 mole) slurry was added in small portions, with ice-cooling, to a stirred solution of phosphorus trichloride (41.1 g., 0.3 mole) in ether (1000 ml.). The mixture immediately became purple and a precipitate began to form. After stirring for 20 hours at 20°, the mixture which had turned blue, was evaporated to dryness. The green, solid residue recovered was extracted with 300 ml. of hot petroleum ether (B.P. 60–110°) from which, at 0°, 12.7 g. (44 percent of the theoretical amount) of colorless, dimeric chlorophospha (III)-carborane (Compound A) separated, M.P. 240–41°.

*Analysis.*—Calc'd for $C_4H_{20}B_{20}Cl_2P_2$ (417.5): C, 11.51; H, 4.83; B, 51.84; Cl, 17.00; P, 14.84. Found: C, 11.17; H, 4.96; B, 51.69; Cl, 17.50; P, 14.86; mol. weight: 407.5.

The formula of Compound A is:

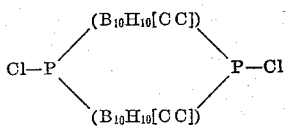

Examples II–V

Several additional experiments were conducted in the same manner as described in Example I. The relevant data are summarized below:

| Example | Carborane [1] | | Phosphorus Trichloride | | Yield of Dimeric Chlorophospha (III)-Carborane | |
|---|---|---|---|---|---|---|
| | Grams | Moles | Grams | Moles | Grams | Percent |
| II | 20.0 | 0.139 | 41.1 | 0.30 | 11.7 | 40.5 |
| III | 7.9 | 0.055 | 16.5 | 0.12 | 5.0 | 44.0 |
| IV | 25.7 | 0.179 | 51.3 | 0.38 | 17.2 | 46.0 |
| V | 25.7 | 0.179 | 51.3 | 0.38 | 17.7 | 47.2 |

[1] $B_{10}H_{10}[C(H)C(H)]$.

Example VI

An amount of 5.5 g. (0.035 mole) of dry dilithiocarborane powder prepared from 5.0 g. (0.035 mole) of carborane and 0.077 mole of butyl lithium, was added in small portions with high speed stirring to 50 ml. of phosphorus trichloride. The temperature was maintained at 3–10° C. during the addition by means of an ice-bath. The resulting slightly yellow slurry was stirred for two hours at room temperature, then evaporated to dryness in vacuo. The soluble part of the remaining solid was recrystallized from petroleum ether (B.P. 60–90° C.) to give 5.5 g. (76 percent of the theoretical quantity) of dimeric chlorophospha (III)-carborane, M.P. 240–41° C. (Compound A).

Example VII

Dilithio-tribromocarborane was obtained by adding a solution of 8.0 g. (0.021 mole) of tribromocarborane (M.P. 329° C.) in 100 ml. of ether with stirring and ice-bath cooling to a solution of 0.06 mole of butyl lithium in a mixture of hexane (75 ml.) and ether (200 ml.). The resulting white slurry was stirred for 2 hours at 0° C., then filtered and the solid $B_{10}H_7Br_3C_2Li_2$ was washed with 100 ml. of ether.

After slurrying with 250 ml. of ether, the dilithio-tribromocarborane thus obtained was added to a solution of 8.2 g. (0.06 mole) of $PCl_3$ in 600 ml. ether. The reaction mixture was stirred at room temperature for 4 hours and filtered. The filter cake was first washed with ether, then thoroughly with water and finally dried in vacuo over $P_2O_5$ to give 4.4 g. (47 percent of the theoretical amount) of dimeric chlorophospha (III)-tribromocarborane, M.P. 407–409° (dec) (Compound B). Recrystallization from benzene did not change the melting point.

*Analysis.*—Calc'd for $C_4H_{14}B_{20}Br_6Cl_2P_2$ (mol. wt. 890.9): C, 5.39; H, 1.59; B, 24.29; Br, 53.82; Cl, 7.96; P, 6.95. Found: C, 5.77; H, 1.87; B, 24.40; Br, 51.6; Cl, 7.96; P, 6.60.

Example VIII

A dilithio-tetrachlorocarborane slurry in ether (200 ml.) prepared from 5.64 g. (0.02 mole) of tetrachlorocarborane (M.P. 350° C.) and 0.044 mole of butyl lithium was added to a cooled solution of 8.2 g. (0.06 mole) of phosphorus trichloride in ether (500 ml.). The mixture was stirred for 12 hours, filtered and the filter cake washed with ether and water. The remaining solid was, after drying recrystallized from benzene to give 5.6 g. (80.8 percent of the theoretical amount) of dimeric chlorophospha (III)-tetrachlorocarborane, M.P. 424–425° C. (Compound C).

*Analysis.*—Calc'd for $C_4H_{12}B_{20}Cl_{10}P_2$ (693.1): C, 6.93; H, 1.75; B, 31.22; Cl, 51.16; P, 8.94. Found: C, 7.44; H, 1.86; B, 30.06; Cl, 50.70; P, 8.35.

The formula of Compound C is:

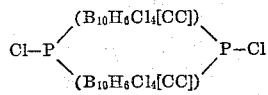

Treatment of the dimeric halophospha (III)-carboranes of this invention with an excess of sodium azide by the process described in Alexander and Schroeder application S.N. 323,416 for Product and Method, filed Nov. 13, 1963, results in the formation of the respective cyclic diazido compound, dimeric azidophospha (III)-carborane. Valuable polymers can be formed by the condensation of dimeric azidophospha (III) with a diphosphine, such as 1,4-bis(diphenylphosphino) benzene as set forth in Alexander and Schroeder application S.N. 323,394 for Composition and Process, filed Nov. 13, 1964, now U.S. Patent No. 3,320,185. These valuable polymeric materials can be compounded with inert mineral fillers, such as asbestos, etc., and then pressure molded to form gaskets, bushings, etc. which are suitable for high pressure and high temperature applications.

The structural formula of Compound A prepared in Example I (dimeric chlorophospha (III) carborane) is shown in FIGURE 1; the structural formula of Compound B prepared in Example VII is the same as the structural formula shown in FIGURE 2 where $n$ is 3 and the halogen is bromine and the structural formula of Compound C prepared in Example VIII is the same as the structural formula shown in FIGURE 2 where $n$ is 4 and the halogen is chlorine.

What is claimed is:

1. A compound of the formula:

$$X-P\begin{matrix}(B_{10}H_nX'_{10-n}[CC])\\ \\ (B_{10}H_nX'_{10-n}[CC])\end{matrix}P-X$$

wherein X and X' are each selected from the group consisting of chlorine, bromine and iodine and $n$ is an integer of from 0 to 10 inclusive.

2. 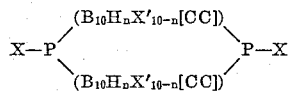

3. 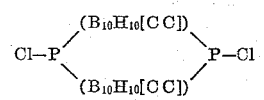

4.

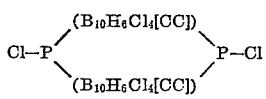

5. A method for the preparation of dimeric halophospha (III)-carboranes which comprises reacting a compound of the formula:

$$B_{10}H_nX'_{10-n}[C(M)C(M)]$$

wherein X' is selected from the group consisting of chlorine, bromine and iodine, $n$ is an integer of from 0 to 10 inclusive and M is an alkali metal selected from the group consisting of sodium, potassium and lithium, with a phosphorus halide of the formula:

$$PX_3$$

wherein X is a halogen selected from the group consisting of chlorine, bromine, and iodine.

6. The method of claim 5 wherein the said compound is:

$$B_{10}H_{10}[C(Li)C(Li)]$$

7. The method of claim 5 wherein the said compound is:

$$B_{10}H_7Br_3[C(Li)C(Li)]$$

8. The method of claim 3 wherein the said compound is:

$$B_{10}H_6Cl_4[C(Li)C(Li)]$$

9. The method of claim 5 wherein the said phosphorus halide is:

$$PCl_3$$

10. The method of claim 5 wherein the reaction is carried out in the presence of an inert organic solvent.

11. The method of claim 10 wherein the said inert solvent is diethyl ether.

12. The method of claim 3 where the temperature of the reaction is between about —20° C. and +95° C.

13. The method of claim 3 wherein the said compound is:

$$B_{10}H_{10}[C(Li)C(Li)]$$

the said phosphorus halide is $PCl_3$, and the reaction temperature is between about —20° C. and +95° C.

14. The method of claim 8 wherein the said compound is:

$$B_{10}H_7Br_3[C(Li)C(Li)]$$

the said phosphorus halide is $PCl_3$, the said inert organic solvent is diethyl ether, and the reaction temperature is between about —20° C. and +95° C.

15. The method of claim 8 wherein the said compound:

$$B_{10}H_6Cl_4[C(Li)C(Li)]$$

the said phosphorus halide is $PCl_3$, the said inert organic solvent is diethyl ether and the said reaction temperature is between about —20° C. and +95° C.

References Cited

Alexander et al., Inorganic Chemistry, vol. 2 pp. 1107-1110 (December 1963).

LORRAINE A. WEINBERGER, *Primary Examiner.*

H. C. WEGNER, *Assistant Examiner.*